(12) United States Patent
Kang

(10) Patent No.: US 12,415,427 B2
(45) Date of Patent: Sep. 16, 2025

(54) DRIVING FORCE CONTROL APPARATUS, SYSTEM INCLUDING THE SAME, AND METHOD THEREOF

(71) Applicants: Hyundai Motor Company, Seoul (KR); Kia Corporation, Seoul (KR)

(72) Inventor: Sheen Gil Kang, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 528 days.

(21) Appl. No.: 17/901,498

(22) Filed: Sep. 1, 2022

(65) Prior Publication Data

US 2023/0256834 A1   Aug. 17, 2023

(30) Foreign Application Priority Data

Jan. 12, 2022   (KR) ........................ 10-2022-0004646

(51) Int. Cl.
*B60L 15/20* (2006.01)
(52) U.S. Cl.
CPC ........... *B60L 15/20* (2013.01); *B60L 2240/14* (2013.01); *B60L 2240/423* (2013.01); *B60L 2240/486* (2013.01); *B60L 2250/26* (2013.01)
(58) Field of Classification Search
CPC ................. B60L 15/20; B60L 2240/14; B60L 2240/423; B60L 2240/486; B60L 2250/26; B60L 2240/12; B60L 2260/26; B60W 30/025; B60W 10/04; B60W 10/18; B60W 30/02; B60W 10/20; B60W 40/02;

(Continued)

(56) References Cited

U.S. PATENT DOCUMENTS 8,214,123 B2 * 7/2012 Inoue ................... B60K 31/047
   180/170
8,219,297 B2 * 7/2012 Inoue ................... B60K 31/047
   180/170

(Continued)

FOREIGN PATENT DOCUMENTS

JP   H06166314 A   *   6/1994
JP   2013-55756 A       3/2013

(Continued)

OTHER PUBLICATIONS

Original and machine translation for JP 2013240258 A (Year: 2013).*

(Continued)

*Primary Examiner* — Frederick M Brushaber
(74) *Attorney, Agent, or Firm* — Morgan Lewis & Bockius LLP

(57) ABSTRACT

A driving force control apparatus includes a sensor that collects information associated with a state of a vehicle, a driving device that provides a driving force to a drive wheel of the vehicle, and a processor electrically connected to the sensor and the driving device, wherein the processor is configured to determine a required driving force of a driver based on at least a part of the information collected by the sensor, when the vehicle accelerates, determines a compensation driving force where a pitch component is removed from the required driving force using a filter which utilizes a natural frequency of the vehicle as a center frequency, and controls the driving device based on the determined compensation driving force.

17 Claims, 13 Drawing Sheets

(58) Field of Classification Search
CPC .... B60W 40/107; B60W 40/11; B60W 50/10; B60W 2050/0005; B60W 2050/0022; B60W 2050/0052; B60W 2420/00; B60W 2520/105; B60W 2520/16; B60W 2540/10; B60Y 2400/30
See application file for complete search history.

(56) References Cited

U.S. PATENT DOCUMENTS

| | | | | |
|---|---|---|---|---|
| 9,409,565 | B2 * | 8/2016 | Bureau | B60W 10/06 |
| 10,940,750 | B2 * | 3/2021 | Pan | B60K 6/445 |
| 2010/0094495 | A1 | 4/2010 | Fujimoto et al. | |
| 2010/0289460 | A1 * | 11/2010 | Otake | H02P 9/04 |
| | | | | 322/19 |
| 2012/0083950 | A1 * | 4/2012 | Yang | B60L 15/20 |
| | | | | 903/903 |
| 2014/0277875 | A1 | 9/2014 | Liang et al. | |
| 2015/0039199 | A1 | 2/2015 | Kikuchi | |
| 2017/0101087 | A1 * | 4/2017 | Momose | B60W 40/11 |
| 2017/0225534 | A1 | 8/2017 | Anderson et al. | |

FOREIGN PATENT DOCUMENTS

| | | | | |
|---|---|---|---|---|
| JP | 2013240258 A | * | 11/2013 | |
| JP | 2015105622 A | * | 6/2015 | B60W 30/19 |
| JP | 2018-90248 A | | 6/2018 | |
| WO | WO 2014-054657 A | | 4/2014 | |

OTHER PUBLICATIONS

Original and machine translation for JP H06166314 A (Year: 1994).*
Original and machine translation for JP 2015105622 A (Year: 2015).*
JP 2012046040 A Original and Translation (Year: 2012).*

* cited by examiner

DRIVING FORCE CONTROL APPARATUS, SYSTEM INCLUDING THE SAME, AND METHOD THEREOF

CROSS-REFERENCE TO RELATED APPLICATION

The present application claims priority to Korean Patent Application No. 10-2022-0004646, filed on Jan. 12, 2022, the entire contents of which is incorporated herein for all purposes by this reference.

BACKGROUND OF THE PRESENT DISCLOSURE

Field of the Present Disclosure

The present disclosure relates to a driving force control apparatus, a system including the same, and a method thereof, and more particularly, relates to technologies of preventing a pitch motion due to rapid acceleration of a vehicle.

Description of Related Art

As interest in environmental issues increases, the development of electrified vehicles which use a driving motor becomes a trend. A driving motor shows fast control response and predicts a driving force accurately. Furthermore, it controls independently each wheel.

Such a motor may be driven by a driving force corresponding to a request of the driver to accelerate the vehicle. However, when the driver accelerates suddenly, a driving force provided to a drive motor may suddenly increase. A pitch motion like an overshoot phenomenon may offend the driver in such a process.

Thus, a pitch motion control technique is applied to the vehicle to prevent the overshoot of pitch motion at sudden acceleration.

In general, to suppress the pitch motion of the vehicle, the pitch motion control technique may gradually increase or limit the driving force by low pass filtering processing. However, such a pitch motion control technique causes time delay in the acceleration response. As a result, it is not effective technique which prevent the pitch motion.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driving force control apparatus of controlling a driving force so that a pitch motion does not occur when a vehicle rapidly accelerates, a system including the same, and a method thereof.

Another aspect of the present disclosure provides a driving force control apparatus of compensating for a required driving force of a driver using a filter which utilizes a natural frequency of a vehicle as a center frequency, a system including the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a driving force control apparatus may include a sensor configured to collect information associated with a state of a vehicle, a driving device configured to provide a driving force to a drive wheel of the vehicle, and a processor electrically connected to the sensor and the driving device. The processor may be configured to determine a required driving force of a driver based on at least a part of the information collected by the sensor, when the vehicle accelerates, determine a compensation driving force where a pitch component is removed from the required driving force using a filter which utilizes a natural frequency of the vehicle as a center frequency, and control the driving device based on the determined compensation driving force.

In an exemplary embodiment of the present disclosure, the processor is configured to use the filter to determine the compensation driving force by multiplying a ratio of a unique pitch component of the vehicle to a target pitch component of the vehicle by the required driving force.

In an exemplary embodiment of the present disclosure, the unique pitch component may include the natural frequency and a pitch damping coefficient of the vehicle. The target pitch component may include a target pitch frequency and a target pitch damping coefficient, which vary when the vehicle is traveling.

In an exemplary embodiment of the present disclosure, the processor may be configured to generate an overlay torque based on the natural frequency and a pitch damping coefficient of the vehicle, a target pitch damping coefficient of the vehicle, the target pitch damping coefficient varying in a state where the vehicle is traveling, and the required driving force, when the unique pitch component of the vehicle and the target pitch component of the vehicle are the same as each other, and generate the compensation driving force by adding or subtracting the generated overlay torque to or from the required driving force.

In an exemplary embodiment of the present disclosure, the processor may be configured to tune a parameter of the filter based on at least a part of the information collected by the sensor.

In an exemplary embodiment of the present disclosure, the processor may be configured to tune the parameter of the filter based on at least one of a vehicle speed information, accelerator pedal operation information, or shift gear operation information.

In an exemplary embodiment of the present disclosure, the processor may be configured to adjust a blocked frequency band of the pitch component by tuning the parameter of the filter.

In an exemplary embodiment of the present disclosure, the processor may be configured to adjust a gain of the filter by tuning the parameter of the filter.

In an exemplary embodiment of the present disclosure, the processor may be configured to generate the compensation driving force by estimating a pitch rate of the vehicle using a unique pitch component of the vehicle and multiplying the pitch rate by a gain of the filter.

According to another aspect of the present disclosure, a vehicle system may include a manipulation device including a steering input device, an acceleration input device, and a brake input device and a driving force control apparatus electrically connected to the manipulation device. The driving force control apparatus may be configured to determine a required driving force of a driver based on at least a part of information collected by a sensor of the vehicle, when the vehicle accelerates, determine a compensation driving force where a pitch component is removed from the required driving force using a filter which utilizes a natural frequency of the vehicle as a center frequency, and control a driving device of the vehicle based on the compensation driving force.

In an exemplary embodiment of the present disclosure, the driving force control apparatus may use the filter to determine the compensation driving force by multiplying a ratio of a unique pitch component of the vehicle to a target pitch component of the vehicle by the required driving force. The unique pitch component may include the natural frequency and a pitch damping coefficient of the vehicle. The target pitch component may include a target pitch frequency and a target pitch damping coefficient, which vary when the vehicle is traveling.

According to another aspect of the present disclosure, an operation method of a driving force control apparatus may include determining a required driving force of a driver based on at least a part of information collected by a sensor of a vehicle, when the vehicle accelerates, determining a compensation driving force where a pitch component is removed from the required driving force using a filter which utilizes a natural frequency of the vehicle as a center frequency, and controlling a driving device of the vehicle based on the compensation driving force.

In an exemplary embodiment of the present disclosure, the operation method may further include using the filter to determine the compensation driving force by multiplying a ratio of a unique pitch component of the vehicle to a target pitch component of the vehicle by the required driving force.

In an exemplary embodiment of the present disclosure, the unique pitch component may include the natural frequency and a pitch damping coefficient of the vehicle. The target pitch component may include a target pitch frequency and a target pitch damping coefficient, which vary when the vehicle is traveling.

In an exemplary embodiment of the present disclosure, the operation method may further include generating an overlay torque based on the natural frequency and a pitch damping coefficient of the vehicle, a target pitch damping coefficient of the vehicle, the target pitch damping coefficient varying in a state where the vehicle is traveling, and the required driving force, when the unique pitch component of the vehicle and the target pitch component of the vehicle are the same as each other, and generating the compensation driving force by adding or subtracting the generated overlay torque to or from the required driving force.

In an exemplary embodiment of the present disclosure, the operation method may further include tuning a parameter of the filter based on at least a part of the information collected by the sensor.

In an exemplary embodiment of the present disclosure, the operation method may further include tuning the parameter of the filter based on at least one of vehicle speed information, accelerator pedal operation information, or shift gear operation information.

In an exemplary embodiment of the present disclosure, the operation method may further include adjusting a blocked frequency band of the pitch component by tuning the parameter of the filter.

In an exemplary embodiment of the present disclosure, the operation method may further include adjusting a gain of the filter by tuning the parameter of the filter.

In an exemplary embodiment of the present disclosure, the operation method may further include generating the compensation driving force by estimating a pitch rate of the vehicle using a unique pitch component of the vehicle and multiplying the pitch rate by a gain of the filter.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
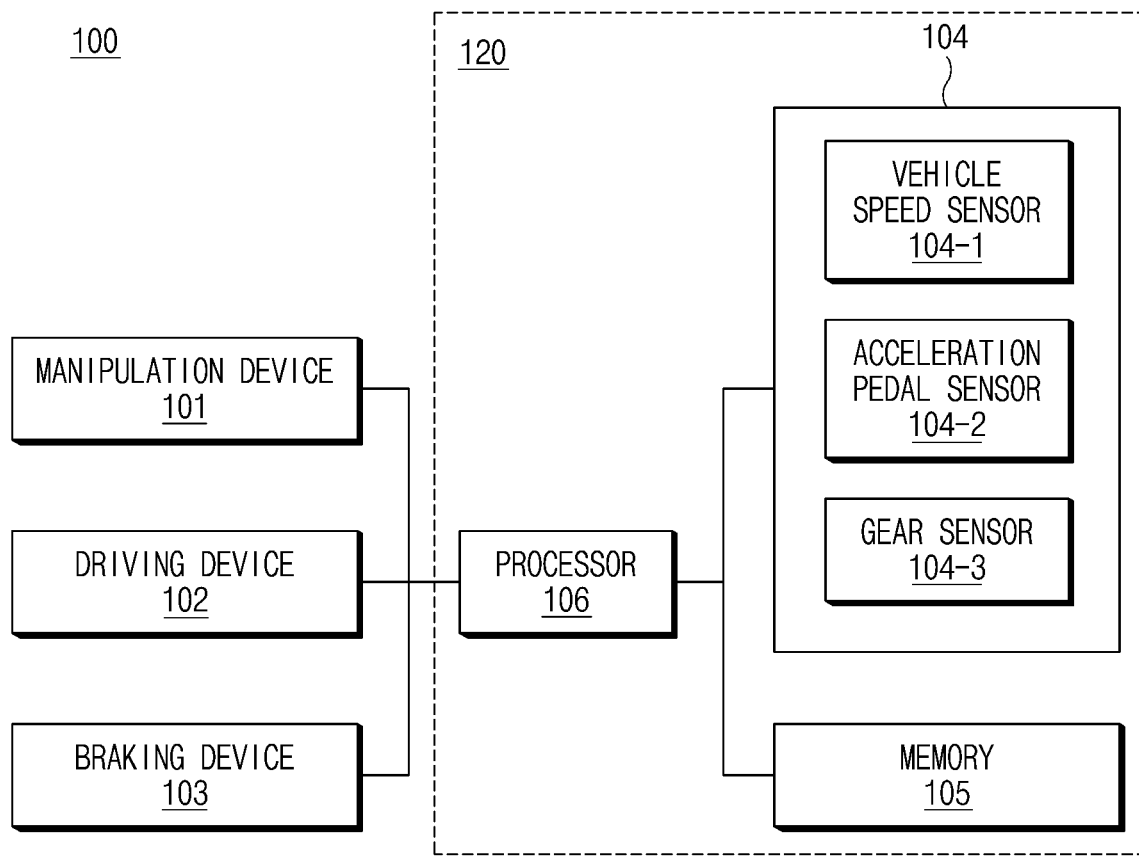
FIG. 1 is a block diagram illustrating a configuration of a vehicle system including a driving force control apparatus according to various embodiments of the present disclosure.

With regard to description of drawings, the same or similar denotations may be used for the same or similar components.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, the same reference numerals will be used throughout to designate the same or equivalent elements. Furthermore, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicle described below may refer to a vehicle driven by the riding and manipulation of a driver and an autonomous vehicle having a function capable of allowing the vehicle to drive on its own without the intervention of the driver. Furthermore, a vehicle is described as one example of a vehicle in the description below, and the present disclosure is not limited thereto. For example, various embodiments below are applicable to various means of transportation such as a ship, an airplane, a train, a motorcycle, or a bicycle.

Hereinafter, various embodiments of the present disclosure will be described in detail with reference to FIGS. 1 to 6.

FIG. 1 is a block diagram illustrating a configuration of a vehicle system including a driving force control apparatus according to various embodiments of the present disclosure.

Referring to FIG. 1, a vehicle system 100 according to various embodiments of the present disclosure may include a manipulation device 101, a driving device 102, a braking device 103, a sensor 104, a memory 105, and a processor 106.

However, this is merely illustrative, and the present disclosure is not limited thereto. For example, at least one of the components of the vehicle system 100 described above may be omitted or one or more other components may be added to the configuration of the vehicle system 100. Furthermore, at least one of the components of the vehicle system 100, which are described above, may be integrated with another component.

According to an exemplary embodiment of the present disclosure, the manipulation device 101 may receive a user input for driving. According to an exemplary embodiment of the present disclosure, the manipulation device 101 may include a steering input device (e.g., a steering wheel), an acceleration input device (e.g., an acceleration pedal), and a brake input device (e.g., a brake pedal).

However, this is merely illustrative, and various exemplary embodiments of the present disclosure are not limited thereto. For example, devices for manipulating a seat heating wire, an internal light, a radio, a navigation system, a turn signal, a tail lamp, a headlamp, a wiper, an air conditioner and furnace, and the like loaded into the vehicle may be configured as at least a part of the manipulation device 101.

According to various exemplary embodiments of the present disclosure, the driving device 102 may generate a power source associated with driving of the vehicle. According to an exemplary embodiment of the present disclosure, the driving device 102 may include an engine and/or a motor. For example, power generated by the driving device 102 may be transferred to an axle through a transmission and a differential gear device. Thus, as a drive wheel rotates by the axle, the vehicle travels. The transmission, the differential gear device, the axle, and the drive wheel are well known in many documents, and a detailed description thereof will be omitted in the present disclosure.

According to various exemplary embodiments of the present disclosure, the braking device 103 may perform electronic control of a brake apparatus in the vehicle. According to an exemplary embodiment of the present disclosure, the braking device 103 may control operations of brakes respectively disposed on a plurality of drive wheels to adjust a speed (e.g., deceleration) of the vehicle.

According to various exemplary embodiments of the present disclosure, the sensor 104 may include at least one sensor configured to collect (or detect) information associated with a state of the vehicle. The information associated with the state of the vehicle may include at least one of a vehicle speed, an accelerator pedal operation, or a shift gear operation. For example, the sensor 104 may include at least one of a wheel speed sensor 104-1, an accelerator pedal sensor 104-2, or a gear sensor 104-3.

However, this is merely illustrative, and various exemplary embodiments of the present disclosure are not limited thereto. For example, the information associated with the state of the vehicle may include lateral acceleration, longitudinal acceleration, or a yaw rate. In this regard, a lateral acceleration sensor, a longitudinal acceleration sensor, and a yaw rate sensor may be provided as components of the sensor 104. Furthermore, the sensor 104 may include various types of sensors (e.g., a radar, a light detection and ranging (LiDAR), a camera, an ultrasonic sensor, a laser scanner, and the like) configured for detecting an obstacle located around the vehicle and obtaining information related to a distance from the obstacle, a relative speed of the obstacle, or a type of the obstacle (e.g., a vehicle, a pedestrian, a bicycle, a motorcycle, or the like).

The wheel speed sensor 104-1 may be mounted on the drive wheel and may be configured to measure revolutions per minute (RPM) of the drive wheel (or a wheel speed). The wheel speed sensor 104-1 is schematically shown as one in the drawing, but not limited thereto. The wheel speed sensor 104-1 may be mounted for each drive wheel to measure a rotation speed of each drive wheel.

The accelerator pedal sensor 104-2 may be configured to measure a position of an accelerator pedal operated by the driver. For example, the accelerator pedal sensor 104-2 may output a quantitative measurement value corresponding to a displacement of the accelerator pedal.

The gear sensor 104-3 may measure a gear shifting state. For example, the gear sensor 104-3 may measure a rotation speed of a drive gear.

According to various exemplary embodiments of the present disclosure, the memory 105 may include data related to at least one other component of the vehicle system 100 and a program, an algorithm, a routine, and/or an instruction associated with an operation (or control) of the vehicle system 100.

For example, the memory 105 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

According to various exemplary embodiments of the present disclosure, the processor 106 may be electrically connected to the manipulation device 101, the driving device 102, the braking device 103, the sensor 104, and the memory 105 and may control the overall operation of the vehicle system 100. For example, the processor 106 may be an electronic control unit (ECU), a micro controller unit (MCU), or another sub-controller, which is loaded into the vehicle.

The vehicle system 100 according to various embodiments of the present disclosure may include a driving force control apparatus 120 configured to control the driving device 102 using a required driving force, a pitch component of which is removed, when the vehicle rapidly accelerates. Such a driving force control apparatus 120 may be implemented in the vehicle. In the instant case, the driving force control apparatus 120 may be integrally configured with control units in the vehicle or may be implemented as a separate device to be connected to the control units of the vehicle by a separate connection means. For example, the driving force control apparatus 120 may include the sensor 104, the memory 105, and the processor 106. However, this is merely illustrative, and another component of the vehicle system 100 may be added to the configuration of the driving force control apparatus 120.

Figure 2A:
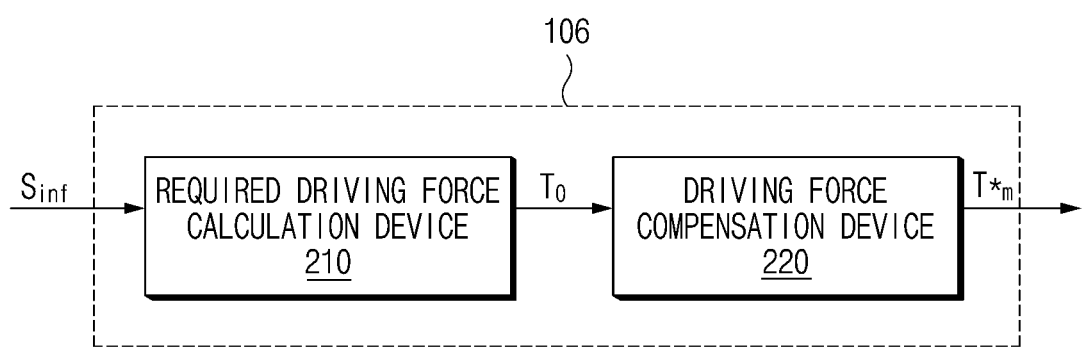
FIG. 2A is a block diagram illustrating a configuration of a driving force control apparatus according to various embodiments of the present disclosure.
Figure 2B:
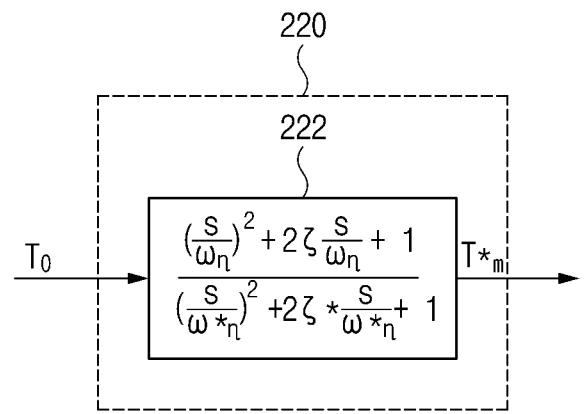
FIGS. 2B and 2C are drawings illustrating a configuration of a driving force compensation device according to various embodiments.
Figure 2C:
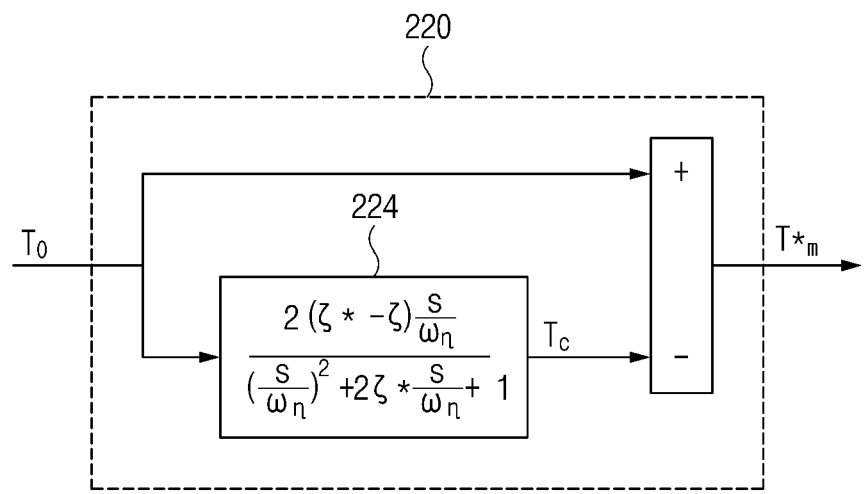

A description will be provided of the driving force control apparatus 120 according to various embodiments with reference to FIG. 2A, FIG. 2B and FIG. 2C.

FIG. 2A is a block diagram illustrating a configuration of a driving force control apparatus according to various embodiments of the present disclosure. FIGS. 2B and 2C are drawings illustrating a configuration of a driving force compensation device according to various embodiments.

Referring to FIG. 2A, a driving force control apparatus 120 (or a processor 106) according to various embodiments of the present disclosure may include a required driving force calculation device 210 and a driving force compensation device 220.

As described above, the driving force control apparatus 120 (or the processor 106) according to various embodiments of the present disclosure may remove a pitch component of a required driving force when the vehicle rapidly accelerates to prevent a pitch motion of the vehicle from occurring.

In this regard, the driving force control apparatus 120 (or the processor 106) may determine a situation where the vehicle rapidly accelerates, based on information collected by the sensor 104 of FIG. 1 while driving. The situation where the vehicle rapidly accelerates may be determined based on at least one of a vehicle speed, an accelerator pedal operation, or a shift gear operation collected by the sensor 104. For example, a situation where at least one of the change amount in pedal force applied to the acceleration pedal, the change amount in vehicle speed, or the change amount in shift, during a predetermined time period, reaches a specified level may be determined as a situation where the vehicle rapidly accelerates. However, this is illustrative, and the driving force control apparatus 120 (or the processor 106) may determine a situation where the vehicle rapidly accelerates in various well-known methods.

According to various exemplary embodiments of the present disclosure, when the situation where the vehicle rapidly accelerates is determined, the driving force control apparatus 120 (or the required driving force calculation device 210) may determine a required driving force ($T_o$) based on at least a portion of information ($S_{inf}$) collected by the sensor 104. The required driving force ($T_o$) may refer to a driving force required by a driver. For example, the driving force control apparatus 120 (or a required driving force calculation device 210) may apply at least one of a vehicle speed, an accelerator pedal operation state, or a shift gear operation state to a predetermined driving force map to determine a required driving force. However, this is merely illustrative, and various embodiments of the present disclosure are not limited thereto. For example, pieces of information collected by various types of other sensors provided in the vehicle, other than a wheel speed sensor 104-1, an accelerator pedal sensor 104-2, and a gear sensor 104-3 of FIG. 1, may be used to determine the required driving force ($T_o$).

According to various exemplary embodiments of the present disclosure, when the required driving force ($T_o$) of the driver is determined, the driving force control apparatus 120 (or the driving force compensation device 220) may determine a compensation driving force $$(T_m^*)$$

by compensating for the required driving force ($T_o$) and may control a driving device 102 of FIG. 1 based on the compensation driving force.

According to an exemplary embodiment of the present disclosure, the driving force control apparatus 120 (or the driving force compensation device 220) may remove a pitch component from the determined required driving force ($T_o$) in determining the compensation driving force $$(T_m^*).$$

For example, the driving force control apparatus 120 (or the driving force compensation device 220) may include a feed forward controller configured to remove a pitch component from the required driving force ($T_o$).

According to various exemplary embodiments of the present disclosure, as shown in FIG. 2B, the driving force control apparatus 120 (or the driving force compensation device 220) may include a filter 222 which removes a pitch component from the required driving force ($T_o$) by use of a natural frequency of the vehicle as a center frequency.

According to an exemplary embodiment of the present disclosure, the compensation driving force $$(T_m^*)$$

may be determined based on a unique pitch component and a target pitch component of the vehicle.

For example, the unique pitch component may be determined based on a natural frequency and a pitch damping coefficient of the vehicle. In other words, the natural frequency and the pitch damping coefficient of the vehicle may be unique components of the vehicle, and a pitch component determined using the natural frequency and the pitch damping coefficient may be defined as a unique pitch component.

Furthermore, the target pitch component may be determined based on the pitch frequency and the pitch damping coefficient of the vehicle, which aim at a situation where the vehicle rapidly accelerates. In other words, the natural frequency and the pitch damping coefficient of the vehicle, which aim at a driving situation, may be components which vary with the driving situation, and a pitch component determined using the natural frequency and the pitch damping coefficient may be defined as a target pitch component.

According to an exemplary embodiment of the present disclosure, the driving force control apparatus 120 (or the driving force compensation device 220) may be defined to multiply the ratio of the unique pitch component $$\left(\left(\frac{s}{\omega_n}\right)^2 + 2\zeta\frac{s}{\omega_n} + 1\right)$$

to the target pitch component $$\left(\left(\frac{s}{\omega_n}\right)^2 + 2\zeta^*\frac{s}{\omega_n^*} + 1\right)$$

by the required driving force ($T_o$) as shown in Equation 1 below to determine a compensation driving force.

$$T_m^* = \frac{\left(\frac{S}{\omega_n}\right)^2 + 2\zeta\frac{s}{\omega_n} + 1}{\left(\frac{s}{\omega_n^*}\right)^2 + 2\zeta^*\frac{S}{\omega_n^*} + 1} T_O \quad \text{[Equation 1]}$$

In Equation 1 above, $$T_m^*$$

refer to the compensation driving force where the pitch component is removed, $\omega_n$ refers to the pitch natural frequency of the vehicle, $\zeta$ refers to the pitch damping coefficient of the vehicle, $$\omega_n^*$$

refers to the target pitch frequency of the vehicle which is traveling, $\zeta^*$ refers to the target pitch damping coefficient of the vehicle which is traveling, and $T_o$ refers to the required driving force of the driver.

When such a compensation driving force $$(T_m^*)$$

is transferred to the driving device 102, a pitch response ($\theta$) of the vehicle may be determined as Equation 2 below.

$$\theta = \frac{G_{\theta 0}}{\left(\frac{s}{\omega_n}\right)^2 + 2\zeta\frac{s}{2\zeta} + 1} T_m^* = \quad \text{[Equation 2]}$$

$$\frac{G_{\theta 0}}{\left(\frac{s}{\omega_n}\right)^2 + 2\zeta\frac{s}{2\zeta} + 1} \frac{\left(\frac{s}{\omega_n}\right)^2 + 2\zeta\frac{s}{\omega_n} + 1}{\left(\frac{s}{\omega_n^*}\right)^2 + 2\zeta^*\frac{s}{\omega_n^*} + 1} T_0 =$$

$$\frac{G_{\theta 0}}{\left(\frac{s}{\omega_n^*}\right)^2 + 2\zeta^*\frac{s}{\omega_n^*} + 1} T_0$$

In Equation 2 above, $\theta$ refer to the pitch motion of the vehicle, $\omega_n$ refers to the pitch natural frequency of the vehicle, $\zeta$ refers to the pitch damping coefficient of the vehicle, $$\omega_n^*$$

refers to the target pitch frequency of the vehicle which is traveling, $\zeta^*$ refers to the target pitch damping coefficient of the vehicle which is traveling, $T_o$ refers to the required driving force of the driver, $$T_m^*$$

refers to the compensation driving force, and $G_{\theta 0}$ refers to the static pitch gain of the vehicle for the driving of the motor.

Referring to Equation 2 above, it may be seen that the target pitch component and the pitch motion of the vehicle have a correlation and that it is configured to adjust the target pitch component to remove the pitch motion of the vehicle. In other words, the compensation driving force $$(T_m^*)$$

generated by the driving force control apparatus 120 (or the driving force compensation device 220) according to an exemplary embodiment of the present disclosure may efficiently remove a pitch motion of the vehicle, which occurs upon rapid acceleration.

As described above, in determining the compensation driving force $$(T_m^*),$$

in general, the unique pitch component and the target pitch component may be differently considered. However, a situation where frequencies of the unique pitch component and the target pitch component are the same as each other may not be excluded.

In this regard, as shown in FIG. 2C, the driving force control apparatus 120 (or the driving force compensation device 220) may include a feed forward compensation controller 224 configured to generate an overlay torque ($T_c$) and generate a compensation driving force $$(T_m^*)$$

by adding or subtracting the overlay torque to or from the required driving force ($T_o$), when the unique pitch component (e.g., the pitch natural frequency ($\omega_n$) of the vehicle) and the target pitch component (e.g., the target pitch natural frequency $$(\omega_n^*)$$

of the vehicle which is traveling) are determined to be the same as each other.

For example, when the target pitch natural frequency $$(\omega_n^*)$$

of the vehicle which is traveling and the pitch natural frequency ($\omega_n$) of the vehicle are determined to be the same as each other, Equation 2 above may be arranged as Equation 3 below.

$$T_m^* = \frac{\left(\frac{s}{\omega_n}\right)^2 + 2\zeta\frac{s}{\omega_n} + 1}{\left(\frac{s}{\omega_n}\right)^2 + 2\zeta^*\frac{s}{\omega_n^*} + 1} T_o = \qquad [\text{Equation 3}]$$

$$T_o - \frac{2(\zeta^* - \zeta)\frac{s}{\omega_n}}{\left(\frac{s}{\omega_n}\right)^2 + 2\zeta^*\frac{s}{\omega_n} + 1} T_o = T_o - T_c$$

Thus, the feed forward compensation controller 224 may include a filter configured to generate an overlay torque such as Equation 4 below.

$$T_c = \frac{2(\zeta^* - \zeta)\frac{s}{\omega_n}}{\left(\frac{s}{\omega_n}\right)^2 + 2\zeta^*\frac{s}{\omega_n} + 1} T_o \qquad [\text{Equation 4}]$$

In Equation 4 above, $T_C$ refers to the overlay torque added and subtracted to or from the required driving force, $\omega_n$ refers to the pitch natural frequency of the vehicle, $\zeta$ refers to the pitch damping coefficient of the vehicle, $\zeta^*$ refers to the target pitch damping coefficient of the vehicle which is traveling, and $T_o$ refers to the required driving force of the driver.

As described above, the overlay torque ($T_C$)) generated by the feed forward compensation controller 224 may be added and subtracted to or from the required driving force ($T_o$) to efficiently remove a pitch motion of the vehicle.

Figure 3A:
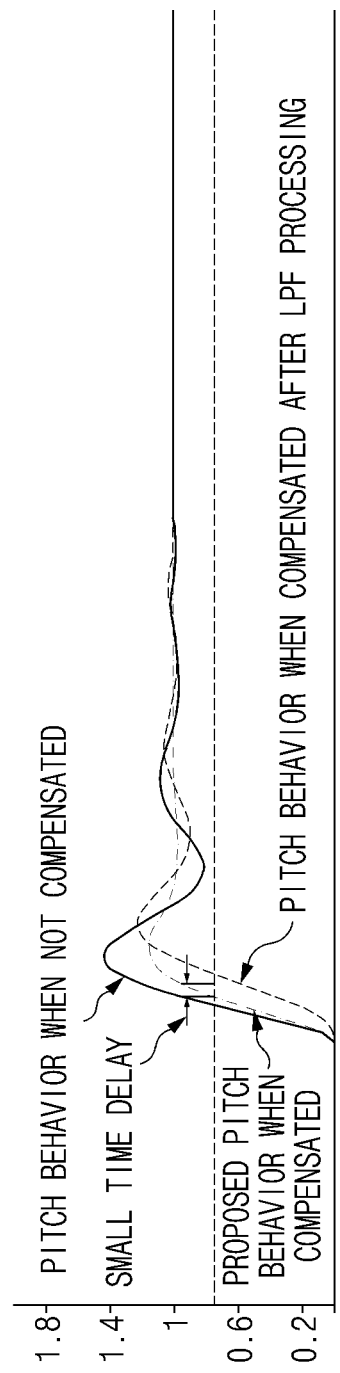
FIG. 3A and FIG. 3B are drawings illustrating the result of comparing operation performance of a vehicle system according to an exemplary embodiment of the present disclosure with operation performance of a vehicle system according to a comparison embodiment.
Figure 3B:
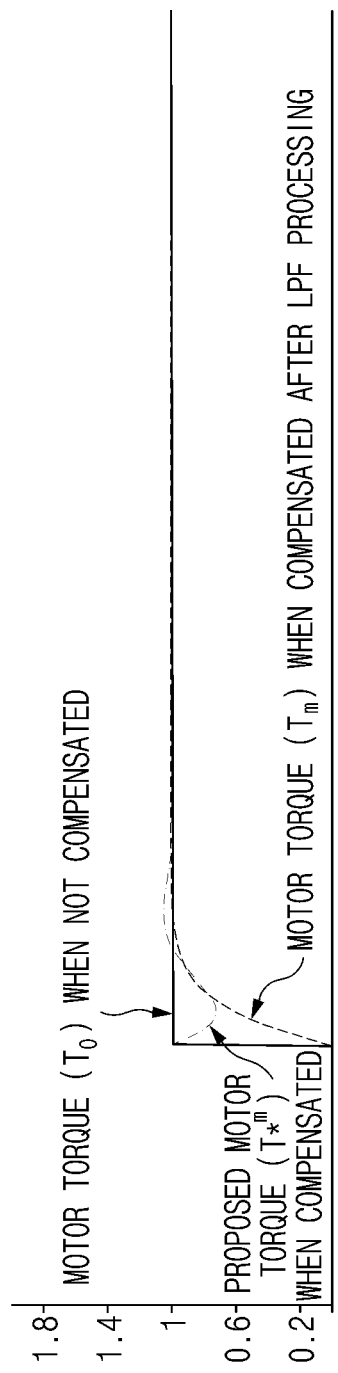

FIG. 3A and FIG. 3B are drawings illustrating the result of comparing operation performance of a vehicle system according to an exemplary embodiment of the present disclosure with operation performance of a vehicle system according to a comparison embodiment.

FIG. 3A illustrates a pitch behavior of a vehicle system according to an exemplary embodiment of the present disclosure and a pitch behavior of a vehicle system according to a comparison embodiment in a rapid acceleration situation. Referring to FIG. 3A, it may be seen that the pitch behavior of the vehicle system according to an exemplary embodiment of the present disclosure is relatively smaller than a pitch behavior of a vehicle system which does not compensate for a required driving force of a driver and a pitch behavior of the vehicle system according to the comparison embodiment, which performs band filtering of the required driving force of the driver to generate a compensation driving force.

FIG. 3B illustrates a change in driving force of a vehicle system according to an exemplary embodiment of the present disclosure and a change in driving force of a vehicle system according to a comparison embodiment in a rapid acceleration situation. Referring to FIG. 3B, it may be seen that the driving force of the vehicle system according to an exemplary embodiment of the present disclosure more reflects requirement of the driver for acceleration without delay than a driving force of a vehicle system which does not compensate for a required driving force of the driver and a driving force of the vehicle system according to the comparison embodiment, which performs predetermined band filtering of the required driving force of the driver to generate a compensation driving force.

FIGS. 4A to 4E are drawings illustrating a driving force compensation device according to various embodiments.

Referring to FIGS. 4A to 4E, as described above, a driving force compensation device 220 according to various embodiments of the present disclosure may compensate for a required driving force ($T_o$) of a driver using a filter which utilizes a natural frequency as a center frequency. For example, to intensively block only the pitch component from the required driving force ($T_o$), the driving force compensation device 220 may include a band stop filter which blocks a frequency band signal between two specified cutoff frequencies and passes a signal of the other frequency band a band pass filter which passes only a signal in a specific frequency band without attenuation and blocks a signal of the other frequency band.

According to various exemplary embodiments of the present disclosure, the driving force compensation device 220 may adjust a blocked width of the frequency band a gain of the filter by tuning a parameter of the filter. According to an exemplary embodiment of the present disclosure, a tuning value of the parameter may be determined based on at least one of a vehicle speed, an accelerator pedal operation, or a shift gear operation collected by a sensor 104 of FIG. 1.

For example, when the blocked bandwidth is reduced by tuning the parameter, a pitch frequency may be intensively removed from the required driving force ($T_o$). Furthermore, when the gain of the filter is reduced, the amount of compensation in the pitch frequency may be reduced and a torque ripple phenomenon by a driving force before and after the compensation may be reduced.

Figure 4A:
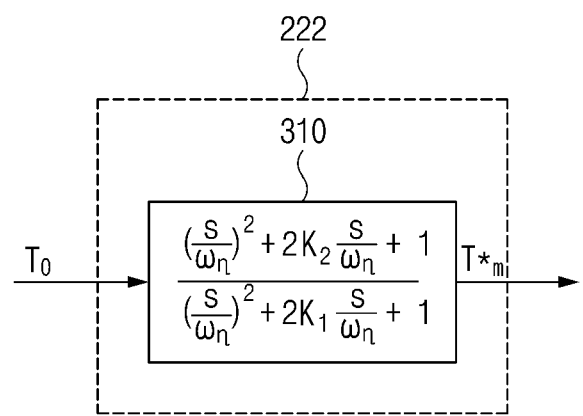
FIG. 4A, FIG. 4B, FIG. 4C, FIG. 4D, and FIG. 4E are drawings illustrating a driving force compensation device according to various embodiments.

Referring to FIG. 4A, the driving force compensation device 220 according to various embodiments of the present disclosure may include a band stop filter 310 which utilizes a natural frequency as a center frequency and may adjust a width of the blocked frequency band and a filter gain by tuning the parameter.

In this regard, the band stop filter 310 of the driving force compensation device 220 may be defined to determine a compensation driving force $$(T_m^*)$$

like Equation 5 below.

$$\frac{\left(\frac{s}{\omega_n}\right)^2 + 2k_2\frac{s}{\omega_n} + 1}{\left(\frac{s}{\omega_n}\right)^2 + 2k_1\frac{s}{\omega_n} + 1} \quad \text{[Equation 5]}$$

In Equation 5 above, $\omega_n$ refers to the pitch natural frequency of the vehicle, $k_1$ refers to the parameter for adjusting the frequency bandwidth, and $k_2$ refers to the parameter for adjusting the gain of the filter.

Figure 4B:
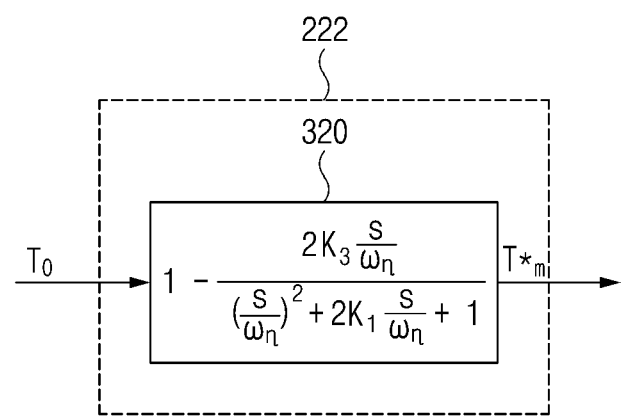

Referring to FIG. 4B, the driving force compensation device 220 according to various embodiments of the present disclosure may include a band stop filter 320 which utilizes a natural frequency as a center frequency and may adjust a width of the blocked frequency band a filter gain by tuning the parameter.

In this regard, the band stop filter 320 of the driving force compensation device 220 may be defined to determine a compensation driving force $$(T_m^*)$$

like Equation 6 below.

$$1 - \frac{2k_3\frac{s}{\omega_n}}{\left(\frac{s}{\omega_n}\right)^2 + 2k_1\frac{s}{\omega_n} + 1} \quad \text{[Equation 6]}$$

In Equation 6 above, $\omega_n$ refers to the pitch natural frequency of the vehicle, $k_1$ refers to the parameter for adjusting the frequency bandwidth, and $k_3$ refers to the parameter for adjusting the gain of the filter.

Figure 4C:
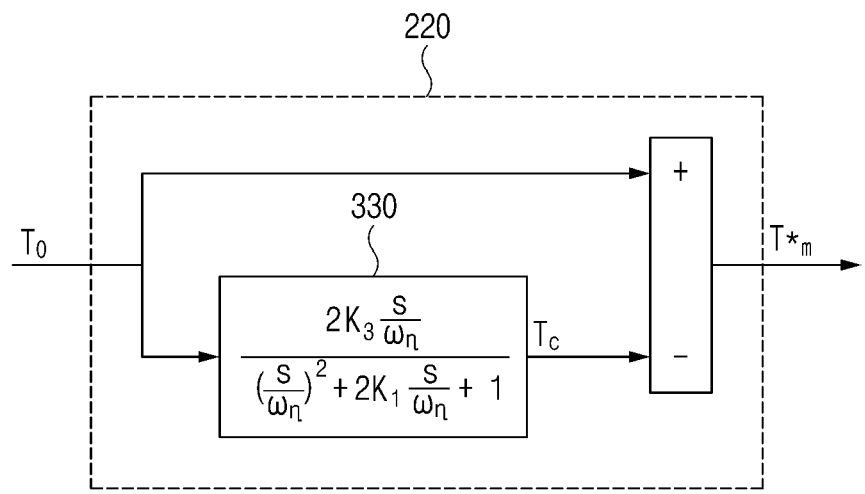

Referring to FIG. 4C, the driving force compensation device 220 according to various embodiments of the present disclosure may include a band pass filter 330 which utilizes a natural frequency as a center frequency and may adjust a width of the blocked frequency band a filter gain by tuning the parameter.

In this regard, the band pass filter 330 may be defined to determine an overlay torque ($T_c$) like Equation 7 below. The driving force compensation device 220 may be configured to add and subtract the overlay torque ($T_c$) to or from a required driving force ($T_o$) to generate a compensation driving force $$(T_m^*).$$

$$\frac{2k_3\frac{s}{\omega_n}}{\left(\frac{s}{\omega_n}\right)^2 + 2k_1\frac{s}{\omega_n} + 1} \quad \text{[Equation 7]}$$

In Equation 7 above, $\omega_n$ refers to the pitch natural frequency of the vehicle, $k_1$ refers to the parameter for adjusting the frequency bandwidth, and $k_3$ refers to the parameter for adjusting the gain of the filter.

Figure 4D:
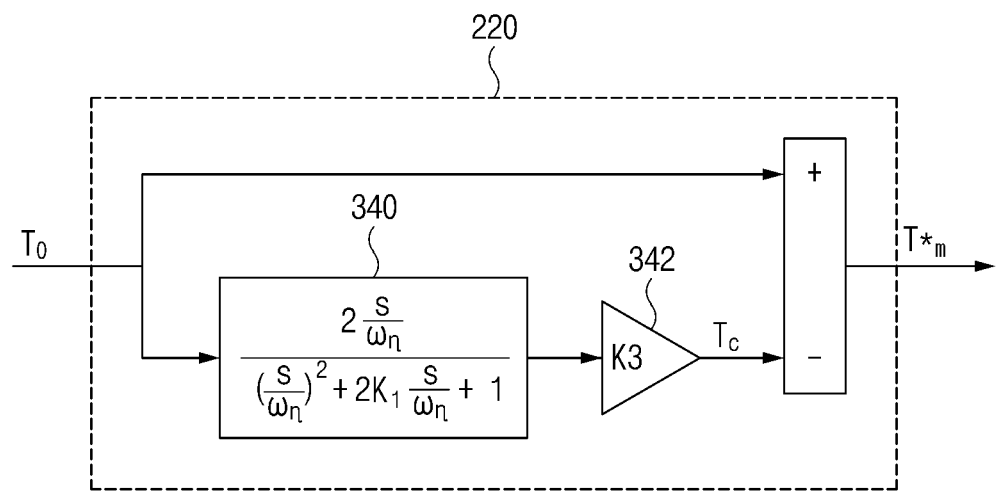

Referring to FIG. 4D, the driving force compensation device 220 according to various embodiments of the present disclosure may include a band pass filter 340 which utilizes a natural frequency as a center frequency and a circuit 342 designed to adjust a filter gain.

In this regard, the band pass filter 340 may be defined to remove a pitch component from the required driving force ($T_o$) like Equation 8 below. The driving force compensation device 220 may determine a compensation driving force $$(T_m^*)$$

by multiplying the required driving force ($T_o$), the pitch component of which is removed, by the filter gain. For example, the driving force compensation device 220 may relatively reduce the gain of the filter to reduce the amount of compensation for the required driving force ($T_o$). Due to the provided configuration, the driving force compensation device 220 may prevent a torque ripple for a driving device 102 from occurring.

$$\frac{2\frac{s}{\omega_n}}{\left(\frac{s}{\omega_n}\right)^2 + 2k_1\frac{s}{\omega_n} + 1} \quad \text{[Equation 8]}$$

In Equation 8 above, $\omega_n$ refers to the pitch natural frequency of the vehicle, and $k_1$ refers to the parameter for adjusting the frequency bandwidth.

Figure 4E:
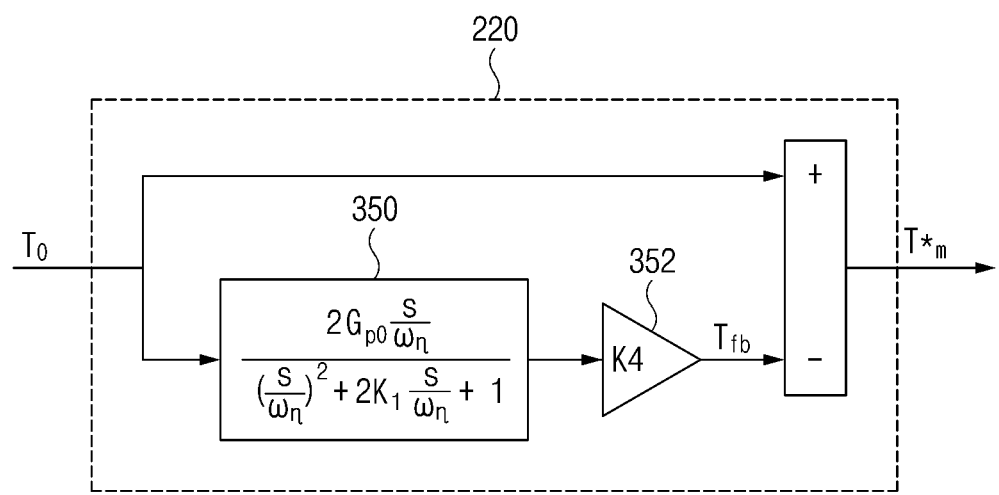

Referring to FIG. 4E, the driving force compensation device 220 according to various embodiments of the present disclosure may include a filter 350 which estimates a pitch rate of the vehicle using a unique pitch component of the vehicle and a circuit 352 designed to adjust a filter gain. For example, the driving force compensation device 220 may multiply the estimated pitch rate of the vehicle by the gain to determine a compensation driving force in which an attenuation coefficient increases.

In this regard, the filter 350 of the driving force compensation device 220 may be designed to determine a pitch rate like Equation 9 below.

$$\frac{2G_{p0}\frac{s}{\omega_n}}{\left(\frac{s}{\omega_n}\right)^2 + 2k_1\frac{s}{\omega_n} + 1} \quad \text{[Equation 9]}$$

In Equation 9 above, $\omega_n$ refers to the pitch natural frequency of the vehicle, $k_1$ refers to the parameter for adjusting the frequency bandwidth, and $G_{p0}$ refers to the static pitch of the vehicle.

Hereinafter, a description will be provided of an operation method of a driving force control apparatus according to an exemplary embodiment of the present disclosure with reference to FIG. 5.

Figure 5:
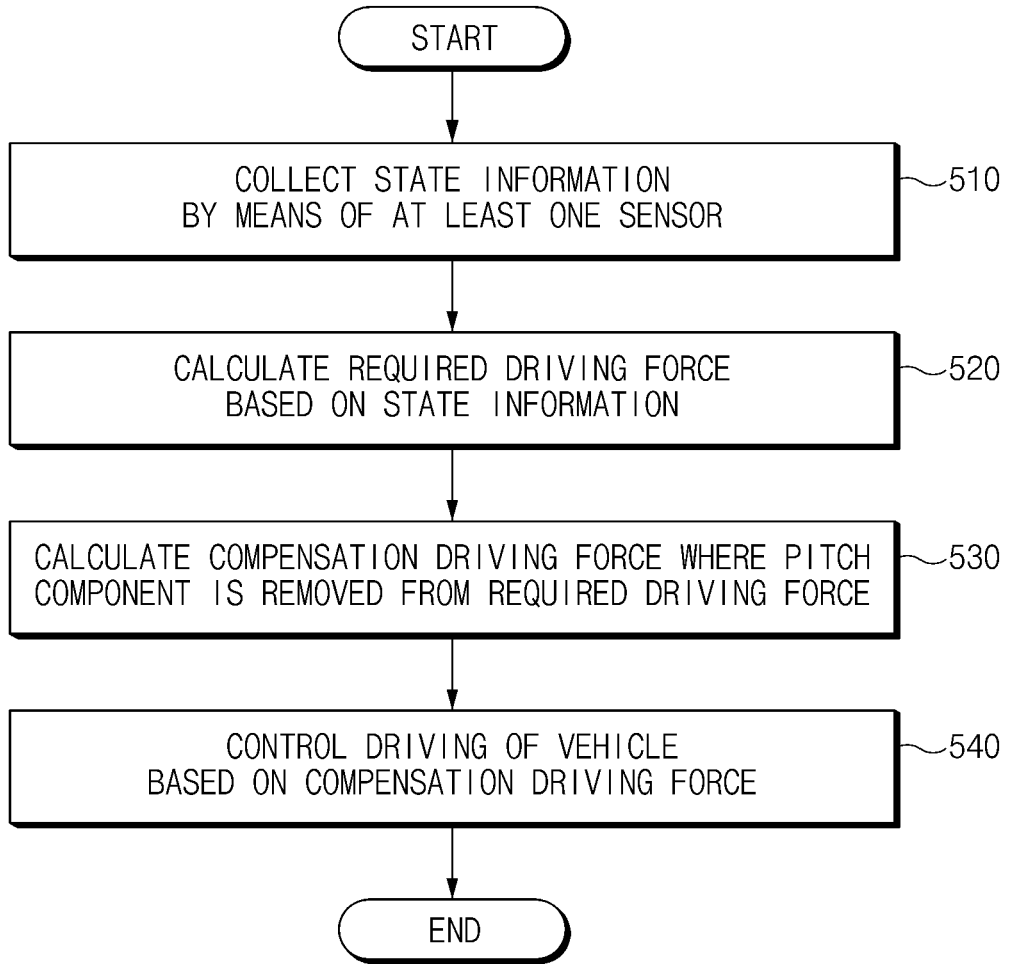
FIG. 5 is a flowchart illustrating an operation of a driving force control apparatus according to an exemplary embodiment of the present disclosure.

FIG. 5 is a flowchart illustrating an operation of a driving force control apparatus according to an exemplary embodiment of the present disclosure. Respective operations in an exemplary embodiment below may be sequentially performed, but are not necessarily sequentially performed. For example, an order of the respective operations may be changed, and at least two operations may be performed in parallel. Furthermore, at least one of operations below may be omitted according to an exemplary embodiment of the present disclosure.

Referring to FIG. 5, in operation 510, a driving force control apparatus 120 (or a processor 106) of FIG. 1 may collect state information by at least one sensor 104. The state information may be used to determine a driving state (e.g., a rapid acceleration situation) of a vehicle. According to an exemplary embodiment of the present disclosure, the driving force control apparatus 120 may collect at least one of vehicle speed information, accelerator pedal operation information, or shift gear operation information by the sensor 104 and may detect a situation where the vehicle rapidly accelerates, based on at least collected one of the vehicle speed information, the accelerator pedal operation information, or the shift gear operation information.

According to various exemplary embodiments of the present disclosure, when the situation where the vehicle rapidly accelerates is detected, in operation 520, the driving force control apparatus 120 (or the processor 106) may determine a required driving force based on at least a portion of the state information. The required driving force may refer to a driving force required by a driver. For example, the driving force control apparatus 120 may apply at least one of a displacement of an acceleration pedal, a driving vehicle speed, a wheel speed, or revolutions per minute (rpm) of an engine and/or motor to a predetermined driving force map to determine a required driving force.

According to various exemplary embodiments of the present disclosure, in operation 530, the driving force control apparatus 120 (or the processor 106) may determine a compensation driving force where a pitch component is removed from the required driving force.

According to an exemplary embodiment of the present disclosure, as described with reference to FIG. 2A, FIG. 2B and FIG. 2C, the driving force control apparatus 120 may remove a pitch component from the required driving force using a filter which utilizes a natural frequency of the vehicle as a center frequency. According to another exemplary embodiment of the present disclosure, as described above with reference to FIG. 4A and FIG. 4B, the driving force control apparatus 120 may adjust a blocked width of a frequency band a gain of the filter by tuning a parameter of the filter, based on a driving situation of the vehicle.

According to various exemplary embodiments of the present disclosure, in operation 540, the driving force control apparatus 120 (or the processor 106) may control driving of the vehicle based on the compensation driving force. According to an exemplary embodiment of the present disclosure, the driving force control apparatus 120 control a driving device 102 of FIG. 1 using the required driving force, the pitch component of which is removed.

Figure 6:
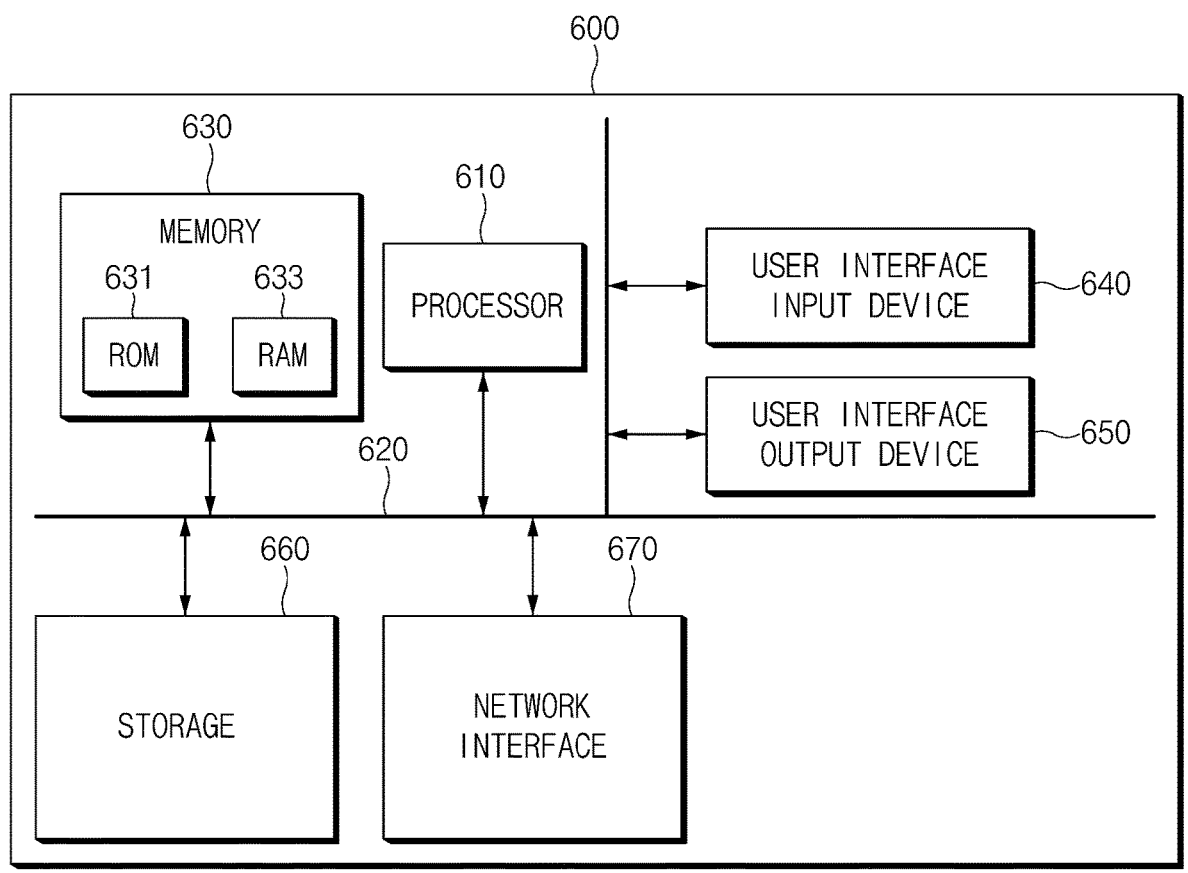
FIG. 6 is a block diagram illustrating a configuration of a determining system for executing the method according to an exemplary embodiment of the present disclosure.

FIG. 6 is a block diagram illustrating a configuration of a computing system for executing the method according to an exemplary embodiment of the present disclosure.

Referring to FIG. 6, a computing system 600 may include at least one processor 610, a memory 630, a user interface input device 640, a user interface output device 650, storage 660, and a network interface 670, which are connected to each other via a bus 620.

The processor 610 may be a central processing unit (CPU) or a semiconductor device that processes instructions stored in the memory 630 and/or the storage 660. The memory 630 and the storage 660 may include various types of volatile or non-volatile storage media. For example, the memory 630 may include a Read-Only Memory (ROM) 631 and a Random Access Memory (RAM) 633.

Thus, the operations of the method or the algorithm described in connection with the exemplary embodiments included herein may be embodied directly in hardware or a software module executed by the processor 610, or in a combination thereof. The software module may reside on a storage medium (that is, the memory 630 and/or the storage 660) such as a RAM, a flash memory, a ROM, an EPROM, an EEPROM, a register, a hard disk, a removable disk, and a CD-ROM. The exemplary storage medium may be coupled to the processor 610. The processor 610 may read out information from the storage medium and may write information in the storage medium. Alternatively, the storage medium may be integrated with the processor 610. The processor 610 and the storage medium may reside in an application specific integrated circuit (ASIC). The ASIC may reside within a user terminal. In another case, the processor 610 and the storage medium may reside in the user terminal as separate components.

The present technology may compensate for a required driving force of a driver using a filter which utilizes a natural frequency of the vehicle as a center frequency, thus preventing a pitch motion from occurring when the vehicle rapidly accelerates and improving driving performance of the vehicle.

Furthermore, the present technology may change a parameter of a filter in accordance with a driving state of the vehicle to generate a compensation driving force where a pitch component of a required driving force is removed, thus effectively removing a pitch component of the vehicle.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A driving force control apparatus, comprising:
a sensor configured to collect information associated with a state of a vehicle;
a driving device configured to provide a driving force to a drive wheel of the vehicle; and
a processor electrically connected to the sensor and the driving device,
wherein the processor is configured to:
determine a required driving force of a driver based on at least a part of the information collected by the sensor, when the vehicle accelerates;
determine a compensation driving force where a pitch component is removed from the required driving force using a filter which utilizes a natural frequency of the vehicle as a center frequency of the filter; and
control the driving device based on the determined compensation driving force.

2. The driving force control apparatus of claim 1, wherein the processor is further configured to utilize the filter to determine the compensation driving force by multiplying a ratio of a unique pitch component of the vehicle to a target pitch component of the vehicle by the required driving force.

3. The driving force control apparatus of claim 2,
wherein the unique pitch component includes the natural frequency and a pitch damping coefficient of the vehicle, and
wherein the target pitch component includes a target pitch frequency and a target pitch damping coefficient, which vary when the vehicle is traveling.

4. The driving force control apparatus of claim 2, wherein the processor is further configured to:
generate an overlay torque based on the natural frequency and a pitch damping coefficient of the vehicle, a target pitch damping coefficient of the vehicle, the target pitch damping coefficient varying in a state where the vehicle is traveling, and the required driving force, when the unique pitch component of the vehicle and the target pitch component of the vehicle are a same as each other; and
generate the compensation driving force by adding or subtracting the generated overlay torque to or from the required driving force.

5. The driving force control apparatus of claim 1, wherein the processor is further configured to:
tune a parameter of the filter based on at least a part of the information collected by the sensor.

6. The driving force control apparatus of claim 5, wherein the processor is further configured to:
tune the parameter of the filter based on at least one of vehicle speed information, accelerator pedal operation information, or shift gear operation information.

7. The driving force control apparatus of claim 6, wherein the processor is further configured to:
generate the compensation driving force by estimating a pitch rate of the vehicle using a unique pitch component of the vehicle and multiplying the pitch rate by a gain of the filter.

8. The driving force control apparatus of claim 5, wherein the processor is further configured to:
adjust a blocked frequency band of the pitch component by tuning the parameter of the filter.

9. The driving force control apparatus of claim 5, wherein the processor is further configured to:
adjust a gain of the filter by tuning the parameter of the filter.

10. A vehicle system, comprising:
a manipulation device including a steering input device, an acceleration input device, and a brake input device; and
a driving force control apparatus electrically connected to the manipulation device,
wherein the driving force control apparatus including a processor is configured to:
determine a required driving force of a driver based on at least a part of information collected by a sensor of a vehicle, when the vehicle accelerates;
determine a compensation driving force where a pitch component is removed from the required driving force using a filter which utilizes a natural frequency of the vehicle as a center frequency of the filter; and
control a driving device of the vehicle based on the determined compensation driving force.

11. The vehicle system of claim 10, wherein the driving force control apparatus is further configured to utilize the filter to determine the compensation driving force by multiplying a ratio of a unique pitch component of the vehicle to a target pitch component of the vehicle by the required driving force,
wherein the unique pitch component includes the natural frequency and a pitch damping coefficient of the vehicle, and
wherein the target pitch component includes a target pitch frequency and a target pitch damping coefficient, which vary when the vehicle is traveling.

12. A method, comprising:
determining, by a processor, a required driving force of a driver based on at least a part of information collected by a sensor of a vehicle, when the vehicle accelerates;
determining, by the processor, a compensation driving force where a pitch component is removed from the required driving force using a filter which utilizes a natural frequency of the vehicle as a center frequency of the filter; and
controlling, by the processor, a driving device of the vehicle based on the determined compensation driving force.

13. The method of claim 12, further including:
using, by the processor, the filter to determine the compensation driving force by multiplying a ratio of a unique pitch component of the vehicle to a target pitch component of the vehicle by the required driving force.

14. The method of claim 13,
wherein the unique pitch component includes the natural frequency and a pitch damping coefficient of the vehicle, and
wherein the target pitch component includes a target pitch frequency and a target pitch damping coefficient, which vary when the vehicle is traveling.

15. The method of claim 13, further including:
generating, by the processor, an overlay torque based on the natural frequency and a pitch damping coefficient of the vehicle, a target pitch damping coefficient of the vehicle, the target pitch damping coefficient varying in a state where the vehicle is traveling, and the required driving force, when the unique pitch component of the vehicle and the target pitch component of the vehicle are a same as each other; and generating, by the processor, the compensation driving force by adding or subtracting the generated overlay torque to or from the required driving force.

16. The method of claim 12, further including:

tuning, by the processor, a parameter of the filter based on at least a part of the information collected by the sensor.

17. The method of claim 16, further including:

tuning, by the processor, the parameter of the filter based on at least one of vehicle speed information, accelerator pedal operation information, or shift gear operation information.

\* \* \* \* \*